Figure 1:
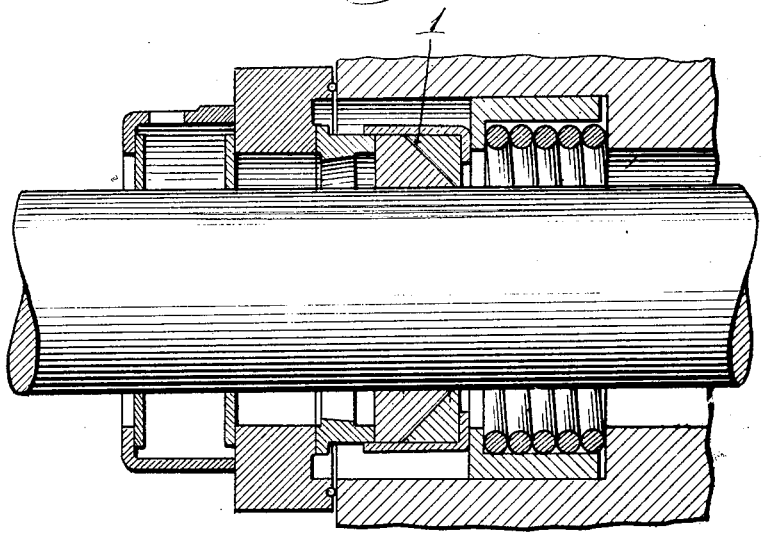

Nov. 13, 1928.

G. C. JEROME 1,691,574

METHOD OF MAKING ROD PACKING

Filed Dec. 15, 1923

Inventor:
George C. Jerome
By Rector, Hibben, Davis & Macauley
his Attorneys.

Patented Nov. 13, 1928.

1,691,574

UNITED STATES PATENT OFFICE.

GEORGE C. JEROME, OF CHICAGO, ILLINOIS, ASSIGNOR TO STEWART MANUFACTURING CORPORATION, OF CHICAGO, ILLINOIS, A CORPORATION OF DELAWARE.

METHOD OF MAKING ROD PACKING.

Application filed December 15, 1923. Serial No. 681,019.

My invention relates to packing for piston and valve rods and the like and the principal objects thereof are to produce a novel and efficient packing for this purpose and to provide a new and useful method for the production of such packing.

In the usual practice in the manufacture and fitting of rod-packing, the ring is made in two or more sections or segments for the purpose of obtaining a continuous close fit around the rod. The sections, forming the ring, are roughly cast in sand molds. The complemental forces of the joints are then ground so as to procure as perfect a fit as possible. The joints of these sections are formed to a feather edge around the rod and the joints must be tight and perfect, as otherwise the ring is useless. In casting the sections in a sand mold, the castings usually are subject to blow or sand holes, and it has been the practice to fill these holes with solder or other suitable soft material. But in use this filling material becomes soft and runs out of the holes with the result, among others, that there is some leakage or escape of the steam as well as breakage of the rings. It has also been found that the complemental faces of a joint cannot be perfectly ground so that they fit together as accurately as required and so that each joint is the same as the other joints of the ring and therefore it has been necessary for the manufacturer of the packing to assemble the sections of the rings together, then soften the material in any suitable manner, and finally place a suitable clamp about the assembled sections to compress them into position, and pound the joints with a heavy hammer until such joints come accurately and close together. The different joints are marked 1—1, 2—2 and so on, according to the number of sections in the ring, so formed, so that the proper complementary joint faces can be brought together when the ring is assembled for use on the rod. In the event that the feather-edge of one of the sections becomes broken in the slightest degree, either in shipping the packing or in handling it before it reaches its destination or in the fitting of such packing upon the rod, the entire ring becomes absolutely useless as the steam would blow through between the rod and inside of the ring where the feather-edge had been broken off. Railroad records have shown that even with the two-piece packing there is a loss or wastage of about 25 per cent on account of this breakage and the actual loss is greater as usually packing rings are formed in three sections for the reason that they then provide a more continuous fit around the rod. If the feather edge of one of these sections is broken, a section from another ring or a spare section cannot be substituted for it because its ground joint surfaces would not exactly coincide with the corresponding or complemental surfaces on the remaining section or sections of the ring. This is the case because the sections are not all exactly the same, it having been found in actual practice impossible to cast the sections and grind the joints so that the sections are interchangeable. Hence with rings, as previously made, if the feather edge of one of the sections is broken in the slightest degree or the section otherwise injured the entire ring is and must be scrapped, although the remaining section or sections may be uninjured and in perfect shape. It is also obvious that were sections from different rings accidentally or otherwise mixed up or substituted while being prepared or bored out by a workman for application to rods all of the sections of all the rings, which do not have their original component sections assembled in proper relation would have to be thrown away because if the original component sections are not used the joints are not tight and close as is required and the ring is useless.

The principal objects of my invention are to make a piston packing ring of two sections, or more if desired, each section including the joint surfaces, being exactly the same as the other section or sections so that the sections may be assembled and used together in any order and interchangeable and sections, kept for such purpose or taken from other rings, may be substituted for broken sections, and also to provide an improved method of manufacturing such sections so that they are interchangeable. Other objects of my invention are to improve the quality and efficiency of the ring and cheapen its manufacture.

Figure 2:
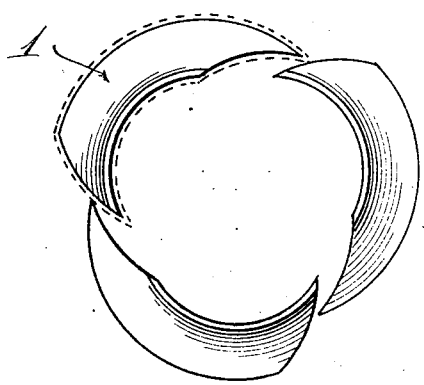
Figure 3:
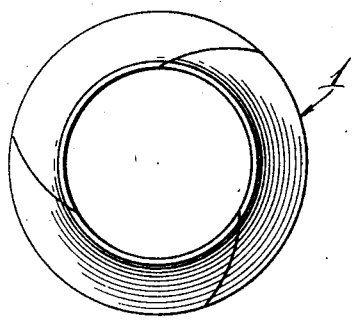

In the drawings, Fig. 1 is a sectional view of a rod-packing showing my packing in position as in actual use; Fig. 2 an end view of the ring showing the finished sections separated and Fig. 3 an end view of the ring with the sections together.

In the present instance by preference I have shown a three-piece ring, but it will be understood that my invention is also applicable to the two-piece ring. I will therefore proceed to describe my invention in accordance with the three-piece ring without intention of limitation thereto.

According to the actual practice of production of my new piston rings, these rings are formed in sections or segments 1, molded from a suitable mixture preferably formed of copper and lead, when used for superheat service. These sections are molded or cast so that they are larger in size than the finished sections, the over-size being indicated in Fig. 2 by the dotted lines. The oversize sections are then separately placed in a cavity in a suitable die or press of any desired construction. The die or press is so formed that the cavity is reduced in size so that it is exactly the size of the finished section and, of course, smaller than the oversize section. The action of the press compacts the metal of the section being formed, making it denser, and reducing its size to the finished dimensions. As each section is pressed exactly to size in the die the sections are all exactly alike and hence the corresponding joints are identical, so that the sections may be interchanged at will, it being unnecessary to fit certain sections together and cause them to properly match each other by pounding their joints as has been the prior practice. It will also be observed that with my process it is unnecessary to grind the joints, and therefore this and other expensive operations are dispensed with. A railroad work-shop, using packing rings, constructed in accordance with my invention, may have on hand spare or extra sections so that should the feather edge of the sections of a ring become injured the spare section may be substituted for it. The necessity for numbering the joint surfaces is also eliminated and blow holes are avoided. The metal being more compact, denser and homogeneous also enhances the quality and increases the durability of the ring.

I claim:

The method of making a complete sectional rod packing or ring which comprises initially casting a plurality of sections each formed throughout to an oversize, and, without further treatment, finishing the ring by reducing each said section to the proper and identical size and shape throughout by pressing in a die whereby the sections of successively formed rings are of identical size and shape with interchangeable joint surfaces.

GEORGE C. JEROME.